Jan. 18, 1949.    J. S. STONER ET AL    2,459,552
APPARATUS FOR PRODUCING PHOTOGRAPHIC MULTIPLE COPIES
Filed Aug. 7, 1945    6 Sheets-Sheet 1
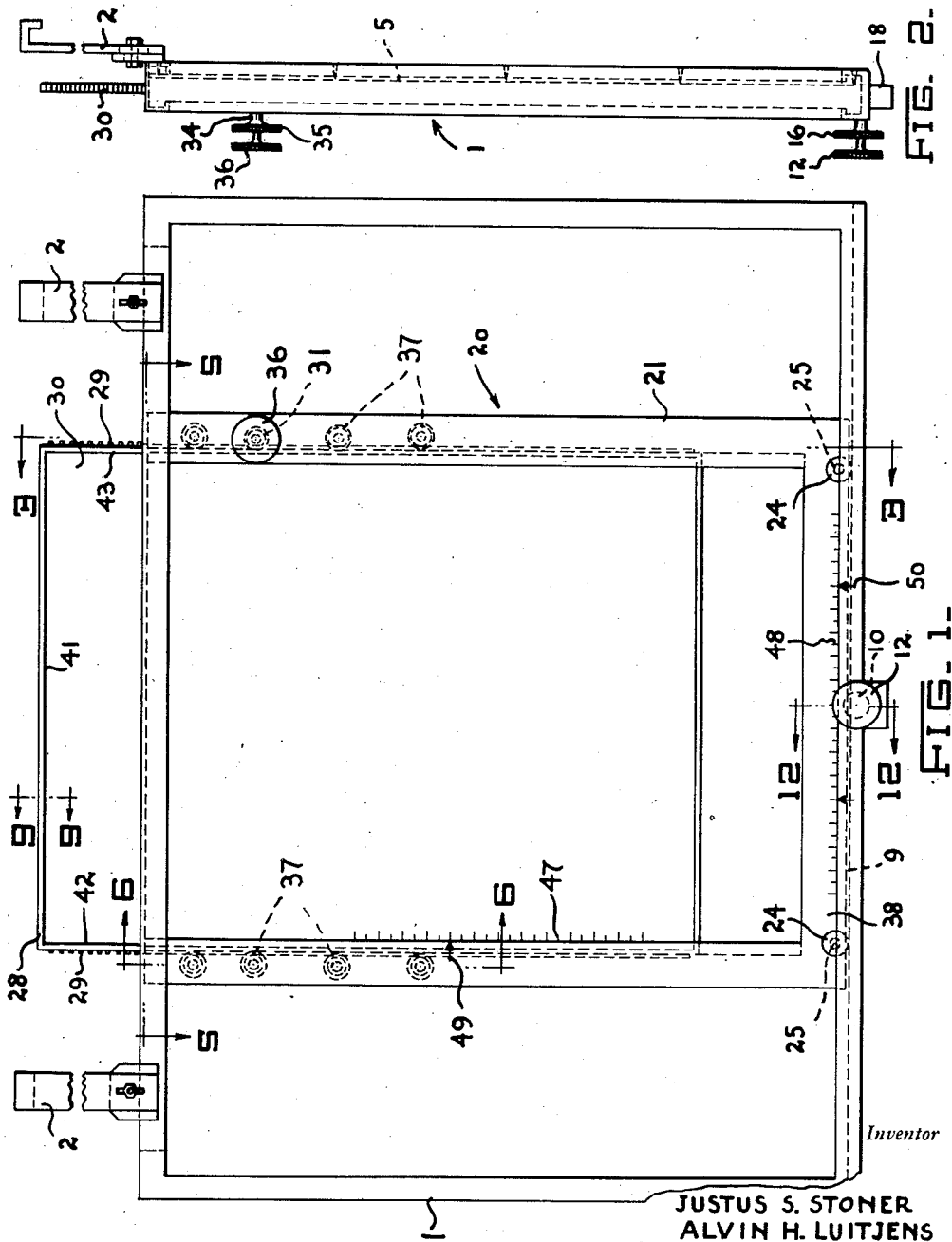
Inventor
JUSTUS S. STONER
ALVIN H. LUITJENS
By
Attorneys Jan. 18, 1949.   J. S. STONER ET AL   2,459,552
APPARATUS FOR PRODUCING PHOTOGRAPHIC MULTIPLE COPIES
Filed Aug. 7, 1945   6 Sheets-Sheet 2
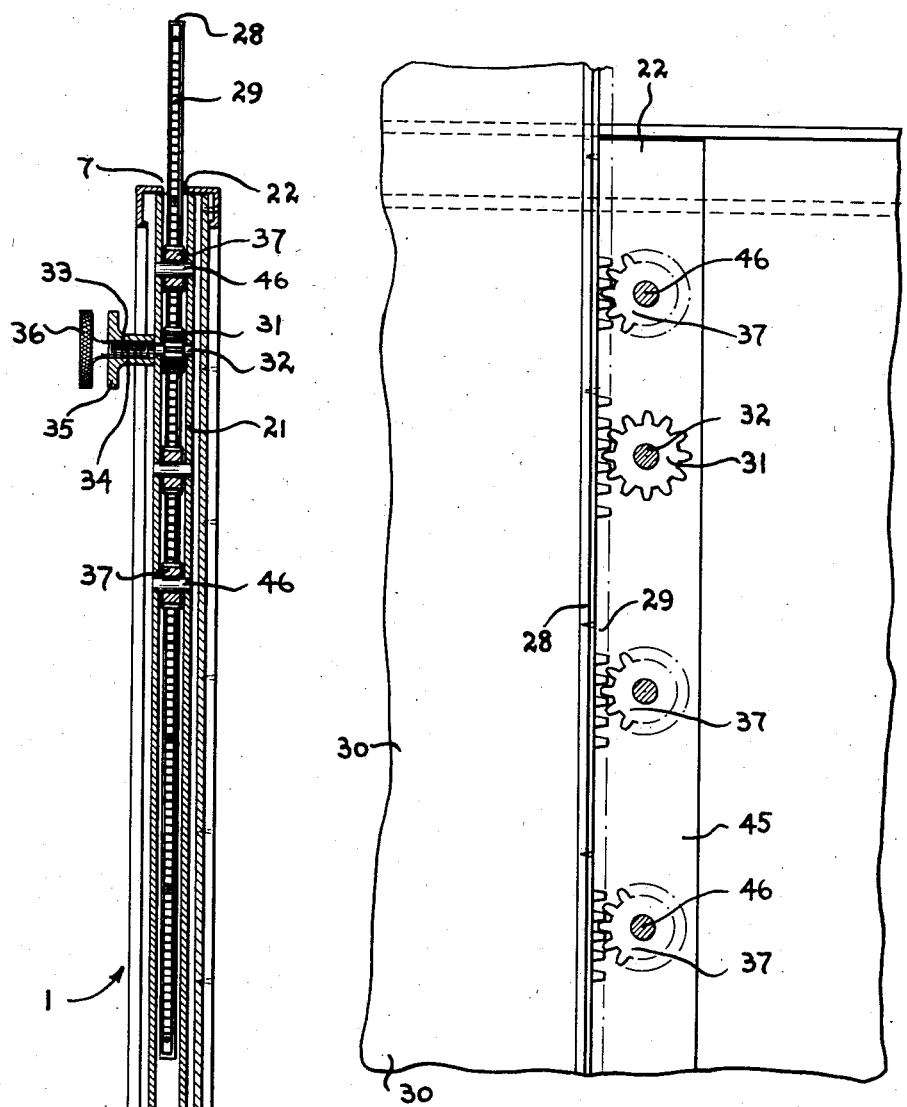
Inventor.
JUSTUS S. STONER
ALVIN H. LUITJENS Jan. 18, 1949.  J. S. STONER ET AL  2,459,552
APPARATUS FOR PRODUCING PHOTOGRAPHIC MULTIPLE COPIES
Filed Aug. 7, 1945  6 Sheets-Sheet 3

Inventor
JUSTUS S. STONER
ALVIN H. LUITJENS

By Clarence A. O'Brien
and Harvey B. Jacobson
Attorneys

Jan. 18, 1949. J. S. STONER ET AL 2,459,552
APPARATUS FOR PRODUCING PHOTOGRAPHIC MULTIPLE COPIES
Filed Aug. 7, 1945 6 Sheets-Sheet 4
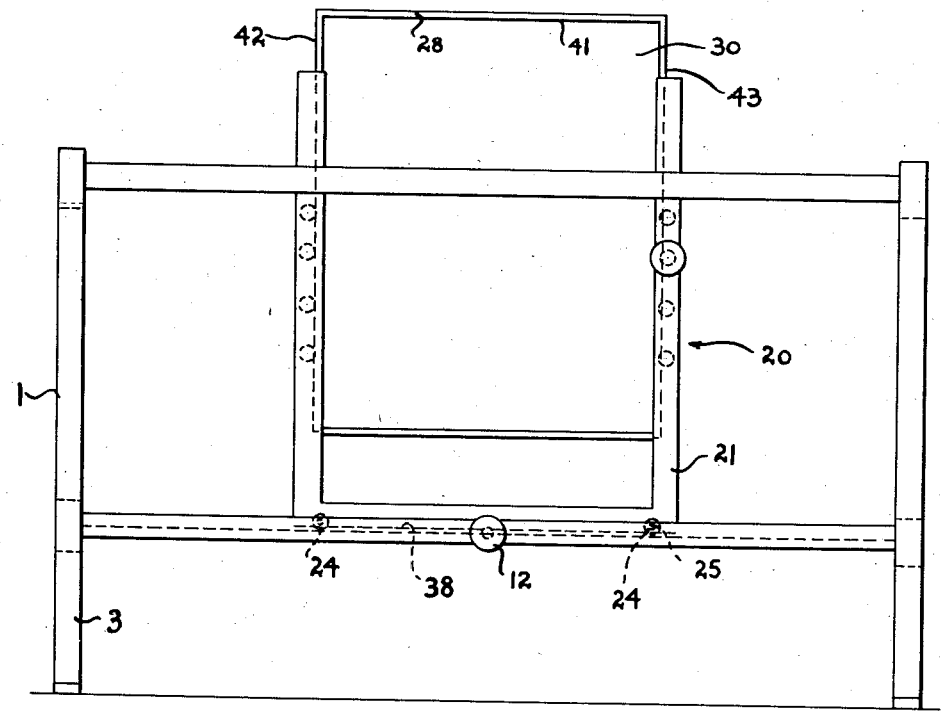
FIG_10_
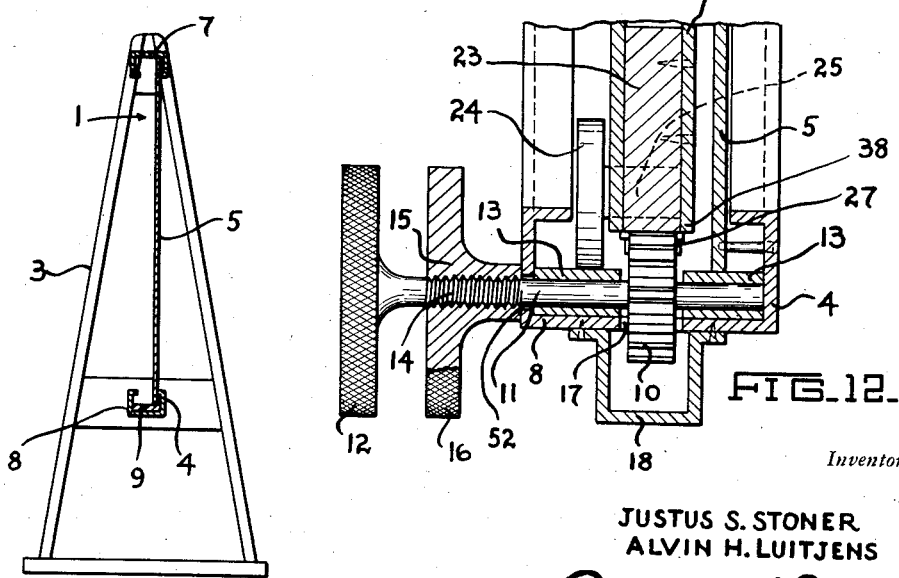
FIG_11_
FIG_12_
Inventor
JUSTUS S. STONER
ALVIN H. LUITJENS
By *Clarence A. O'Brien*
and *Harvey B. Jacobson*
Attorneys Jan. 18, 1949.  J. S. STONER ET AL  2,459,552
APPARATUS FOR PRODUCING PHOTOGRAPHIC MULTIPLE COPIES
Filed Aug. 7, 1945  6 Sheets-Sheet 5
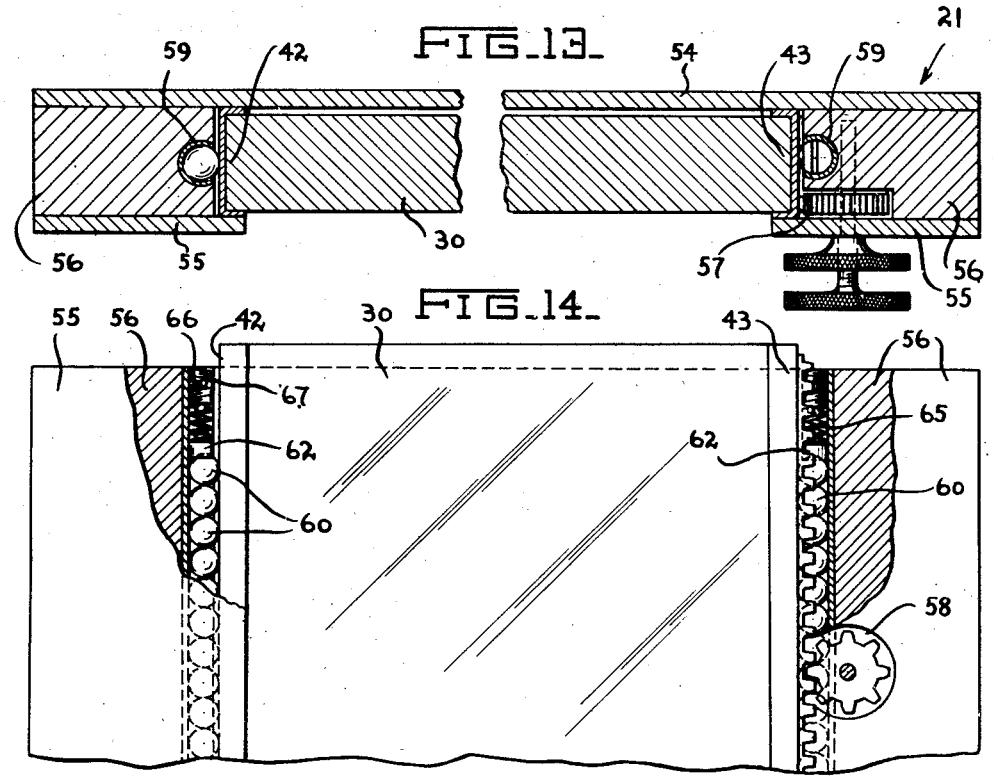
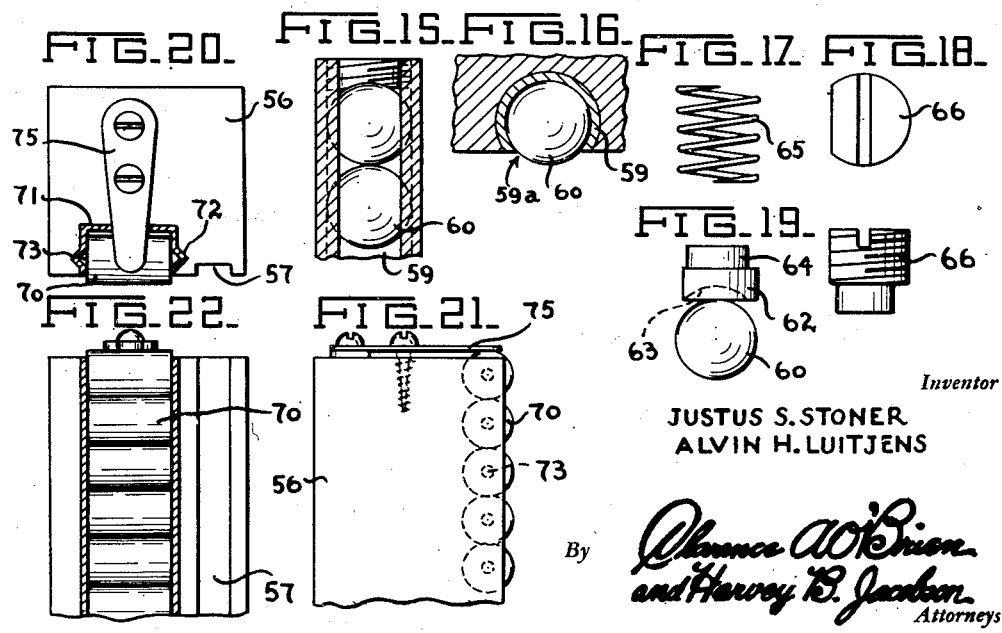
Inventor
JUSTUS S. STONER
ALVIN H. LUITJENS

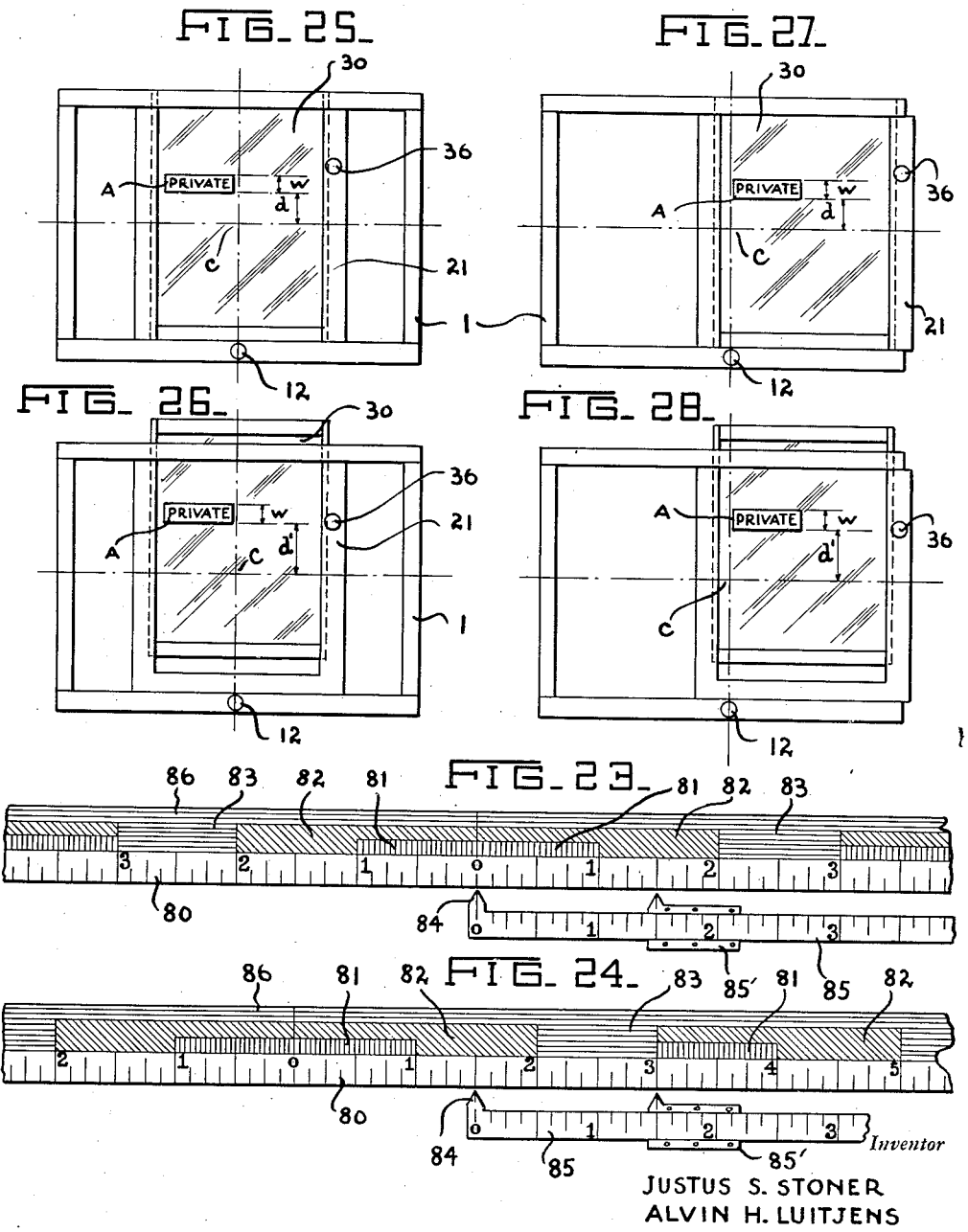

Patented Jan. 18, 1949

2,459,552

UNITED STATES PATENT OFFICE 2,459,552

APPARATUS FOR PRODUCING PHOTOGRAPHIC MULTIPLE COPIES

Justus S. Stoner, El Cajon, and Alvin H. Luitjens, San Diego, Calif.

Application August 7, 1945, Serial No. 609,398

1 Claim. (Cl. 88—24)

This invention has reference to a photographic apparatus for producing a large number of photographic copies in a preselected order or arrangement from a single original on a sensitized film or plate and it has for its principal object to provide an apparatus, applicable to all kinds of originals, such as prints, pictures, drawings, and the like, by means of which multiple reproduction on a sensitized surface with a maximum of economy as regards sensitized material and time and with a maximum simplicity as regards manipulation in the dark room may be obtained.

The methods hitherto employed do not allow to obtain at the same time great economy as regards the material used and as regards time, and they require much skill in order to carry out effectively rather complex manipulations in the dark room. They either change or advance permanently the sensitized surface and endeavor to obtain economy by reducing the size of the film or of the exposed surface, or they use masking devices in the camera covering up the unexposed parts of the sensitized surface so as to make them available for use during subsequent exposures. These masking devices are either enclosed in the magazines housing the film or plate or they are operated like a focal shutter. In the former case they require the shifting or other displacement of the magazine containing the sensitized film or plate and the readjustment of the mask after each exposure. It will be easily understood that the speed with which multiple copies from one original can be made in this way is dependent on the time required for the readjustment of the camera after each exposure which includes the readjustment of the masking device and the changing or advance of the film, plate or other sensitized surface.

According to the invention use is made of the fact that a black surface and especially a glossy black surface when used behind a glass or other transparent surface does not reflect light affecting a sensitized layer and a board presenting such a surface is therefore employed upon which the original is fixed. This board is provided with vertical and horizontal adjustment means.

According to the present invention, therefore, the original to be reproduced is affixed on a non actinic surface and the camera is so adjusted that the image of the original on the sensitized surface within the camera, consisting of a film or a plate, covers only a fraction of said surface. A number of exposures is made in succession and after each exposure the non actinic surface or plate is moved in a plane parallel to the plane of the sensitized surface in the camera for a distance corresponding to the dimension of the original in this direction. Images of the original are thus aligned on the sensitized film or plate by successive exposures until the sensitized surface is covered to the desired extent with the images, which may be located so close to each other that practically no empty space exists between them.

This manipulation, as will be clear, does not include any adjustment or readjustment of the camera, or the introduction, selection, shifting or advance of any masking device; it simply consists in a predetermined shifting of the board carrying the original from which the copies are to be made to an extent corresponding to its dimensions. Shifting of the board for the width or length of the original to be reproduced automatically places the next picture on the film or plate in vertical or horizontal alignment to the picture exposed during the previous exposure and it, therefore, results in a perfect economy as regards the sensitized materials; at the same time the manipulation apart from the simple process of exposing the plate or film is reduced to the described shifting of the original on the board after each exposure.

The apparatus used, according to the invention, consists in a board provided with means for accurately and precisely displacing the same for measured distances in two dimensions and further provided with means permitting to effectively control and measure the distances through which the displacement has to take place.

It will be clear from the above description that each sensitized film or plate contains, after such multiple exposure, a number of closely adjacent photographic images of the original which are simultaneously developed and may afterwards be copied by using approved time saving processes. In this way it is possible to make a relatively large number of copies in a short time and at costs which are much lower than the costs involved in the usual photostat or other photo-reproduction processes. This method will, therefore, fill the gap which exists between the usual photographic reproduction processes with reproduction costs which are a multiple of the costs for the first reproduction and the mechanical processes which require a relatively high minimum number of copies to be made to be able to furnish reproduction at low costs.

Further advantages and further objects of the invention will be apparent from the following detailed specification describing the method and the apparatus used for carrying it into effect in detail.

Several modifications of the apparatus are described. It is to be understood that this description is illustrative and is intended to show, by way of example, the process steps and means which may be used to obtain the desired results; although the description refers to specific embodiments of the invention it is intended to suggest further and other embodiments to the expert skilled in the art and such further embodiments are therefore part of the invention and do not constitute a departure therefrom.

In the accompanying drawings:

Figure 1 is an elevational front view of the apparatus.

Figure 2 is an elevational side view of the same.

Figure 3 is a sectional elevational view on an enlarged scale, the section being taken along line 3—3 of Figure 1.

Figure 4 is a partial front view on an enlarged scale of the apparatus with the front cover removed.

Figure 10 is an elevational view of the apparatus when mounted on an easel.

Figure 11 is a sectional elevational view of the same apparatus.

Figure 12 is an elevational sectional view of the mechanism for moving the frame taken along line 12—12 of Figure 1.

Figure 13 is a horizontal sectional view of a modification on an enlarged scale.

Figure 14 is an elevational view of the same modification.

Figures 15 to 19 show views partly in section of details of the modification.

Figures 20, 21 and 22 are a top view, partial side view and front view, respectively, of another modification.

Figures 23 and 24 are front views of the scale used. The views are identical and merely show the frame in different positions.

Figures 25 to 28 are diagrammatic views illustrating the method and merely show different position of the frame and work plate.

Figure 5:
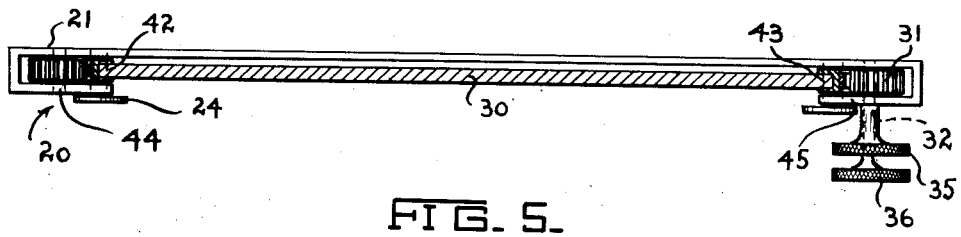
Figure 5 is a partly sectional top view of the apparatus, the section being taken along line 5—5 of Figure 1.

The apparatus used in connection with the described method consists essentially of a framework holder 1, which is suspended by means of a suitable attachment 2, or mounted on an easel 3, which is not shown in some figures as it is part of the usual dark room equipment and serves only as a support. In Figures 10 and 11 the usual dark room easel is shown diagrammatically. It is to be understood that it may be dispensed with or replaced by other equipment to which the framework holder 1 may be attached. The framework holder 1 may be made of plywood, plastic, or metal, and in the latter case it is preferably made of light metals or light metal alloys, such as dural, magnalium or Duralumin. It may consist of channel irons 4 (Figures 3, 6, 11 and 12) which for greater stability are backed by a plywood board 5 or a metal plate.

Figure 6:
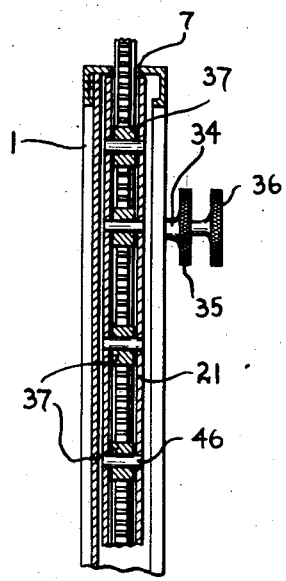
Figure 6 is an elevational cross sectional view, taken along line 6—6 of Figure 1.
Figure 7:
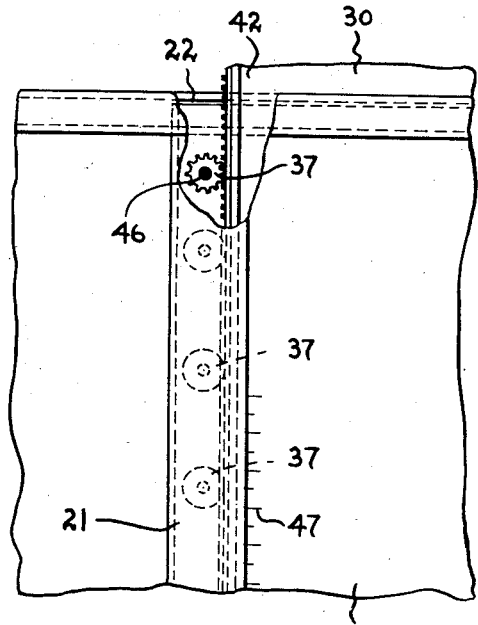
Figure 7 is a front view of the upper left part on an enlarged scale.
Figure 8:
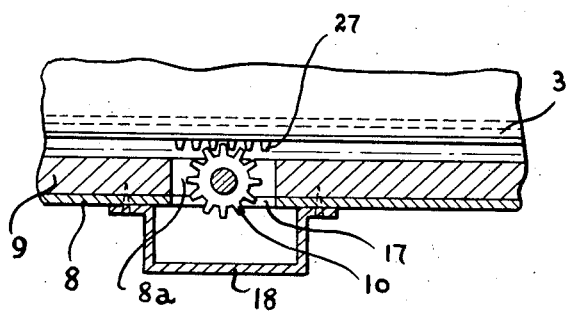
Figure 8 is a partial sectional elevational view of the lower part of the frame.
Figure 9:
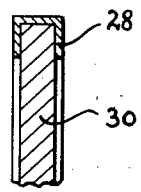
Figure 9 is a sectional detail view of the glass plate and its edge taken along line 9—9 of Figure 1.

The top of the framework holder is slotted (at 7, Figures 3 and 6). The bottom 8 serves as a guide and support and it is therefore provided with a track beam or rail 9 (Figures 3, 8 and 11).

In the center of the bottom portion 8 the track beam 9 is provided with a cut or recess 8a accommodating a toothed pinion or wheel 10, which is fixedly mounted on an axle 11 projecting forwardly and passing through a suitable hole 52 in the front side of the channel iron 4. At the end of the axle a knob 12 with a knurled circumference is arranged, by means of which the toothed wheel 10 may be rotated.

Suitable bearings 13 for the axle may be mounted on the channel iron near the pinion 10.

The axle is provided with a thickened threaded portion 14 and a screw 15 provided with a knurled knob 16 may engage said portion. This screw when tightened and bearing down on the front of the channel iron 4 will fix the axle against rotation and prevent turning of the pinion 10.

In order to permit the insertion of a toothed wheel 10 of suitable size said wheel may pass through a slot 17 of the channel iron. A small cap 18 attached to the lower side of the framework holder encloses the protruding part of the toothed wheel and protects it and the operator.

Within the framework holder 1 the copying board 20 is movable which consists of a frame or support 21 mounted and guided for horizontal movement on the framework holder 1, and of the work plate 30 held and mounted for vertical movement within the frame or support 21.

The said frame is preferably a structure made of light metal or of a light metal alloy and consists of channel or U-shaped pieces welded or otherwise joined together to form a rectangular or square frame. On three sides the frame is laterally closed while it is open at the upper side 22. The bottom side 38 may be reinforced by an inset or ledge piece 23. This reinforced bottom piece 38 carries two or more rollers 24 (Figures 1, 3, 10 and 12) which roll on the track beam 9 of the framework holder 1. They are supported by stub axles 25 held within and laterally projecting from the reinforced bottom part 38 of the frame 21, a rack 27 (Figures 8 and 12) is mounted which is adapted to engage and to mesh with the toothed pinion 10. It will thus be clear that, if the operator turns the knob 12, the axle 11 and the pinion 10 are turned and the frame 21 is shifted laterally and horizontally by virtue of the rack 27 engaging pinion 10. During this lateral movement the frame 21 is guided on the rollers 24.

The work plate 30 consists of glass, plastic, vitrolite or of some other preferably transparent material one side of which is covered with a layer whose color is a glossy black on the side turned toward the camera. It was found by experiment that such a layer is to be preferred to other non actinic layers and especially to a layer of dull black turned toward the camera and that no trace of exposure on the film was found after lighting up the work plate while with other black and colored layers traces of an exposure could frequently be detected. As a rule the rear face of the work plate is covered with the glossy black layer.

The work plate 30 is preferably protected at its thin edges and especially at its upper thin edge 41 by a metal strip or board 28. The lateral edges 42, 43 which slide within the lateral U-shaped portions 44, 45 of the frame 21 do not only carry a reinforcing or protecting metal strip 28 but also a rack 29 fixed thereto. The teeth of this rack engage the teeth of a pinion 31 carried on an axle 32 which is journaled within the frame 21. The axle is provided with a thickened screw threaded portion 33 carrying a fixing screw 34 with a knurled head portion 35. The axle itself carries another knurled knob 36 by means of which the pinion 31 may be rotated.

Both lateral portions 44, 45 of the frame 21 are moreover carrying a number of further pinions 37 mounted on axles 46 journalled in said frame which provide guiding means for the work plate and prevent edging. When the knob 36 is turned the work plate 30 slides upwardly or downwardly.

When sliding upwardly it passes through the opening 22 in the upper side of the frame. After having been adjusted the work plate 36 is held by means of the fixation screw 34 provided with the knob 35.

The lateral edges 42, 43 of the work plate 30 and the bottom piece 38 of the frame 21 are both provided with scales 47, 48 (Figure 1), respectively, cooperating with marks 49, 50 on the members on which they slide in order to facilitate alignment of the images on the sensitized plate or film and to accelerate operation.

It will be realized from the description that movement of the copying board 20 in a horizontal direction is performed by shifting the frame 21 within the framework holder 1, while the vertical movement is performed by moving the work plate 30 within the frame 21. In order to facilitate and accelerate the manipulation it is of great advantage to fix the position of the work plate 30 and of the frame 21, respectively, using only one fixation means and to move the copying board in either of the two directions (horizontal or vertical) by a single knob, handle crank or hand wheel.

Difficulties in guiding the movable parts securely and precisely while moving and fixing them at one point only are, however, experienced. Especially the work plate 30 when moved and fixed by means of one pinion on one side has a marked tendency to edge and to jam.

In order to obtain a vertical movement which is safely guided along both sides, avoiding edging or jamming a special guiding means may be employed. It consists of ball or roller races inserted between the frame 21 and the work plate 30 as illustrated in Figures 13 to 21.

The frame 21 in this case consists preferably of two members, one of which forms a solid back panel 54 while the second member 55 forms a frame on the front around the glass or other transparent work plate 30. The lateral portions of this structure between these two members are filled by blocks 56 which are solidly fixed to the members 54 and 55. These blocks 56 are provided with a continuous recess 57 accommodating the rack and with a local recess 58 for the pinion. A third continuous recess 59 running along one of the sides accommodates a slotted or partially cut cylindrical guide and ball race 59 for balls 60.

This container or ball race 59 encircles the balls over an arc which is substantially larger than a half-circle as will be seen from Figures 15 and 16. It is completely filled with balls 60 which are in touch with each other. These balls 60 are fitted into and are therefore firmly held in the container 59 and are only protruding somewhat from the container and the slot or cut portion 59a of the race 59 (Figures 16, 17) which faces the edges 42, 43 of the work plate 30. The edges of work plate 30 are therefore held along their entire length within the frame by said balls 60. At the end of the race 59 a closing member or plug 62 with a spherical surface 63 (Figure 19) accommodating part of a ball is arranged, which carries a stepped cylindrical part 64. This stepped portion serves as a base or retaining member for a strong compression spring 65 which is supported by a screw 66 with a similar stepped portion which is held firmly within a screw threaded portion 67 of the race 59. The compression spring 65 presses the balls firmly towards each other so that they form a continuous series guiding the edges of the work plate 30 practically along their entire length and not permitting any edging.

As the entire structure is contained within the blocks 55 the ball races are easily adjusted within the frame without play.

Figures 20, 21 and 22 illustrate a further modification with rollers 70. In this case the blocks 56 are provided with a rectangular race 71 in the form of a channel or chute preferably having small triangular or square recesses 72 (Figure 20) forming protuberances on the outside. Into this channel like roller race 71 the rollers 70 are inserted one on top of the other so that they are touching each other. They may be provided with short button like stub axles 73 entering the recesses 72. They may be held within the channel in the way which has been shown in connection with the balls by means of an end piece, a compression spring and a screwed plug, but in the modification shown in Figures 20-22 a simplified arrangement has been illustrated, according to which a strong leaf spring 75 fixed at the end of the block 56 is simply pressing on the topmost roller 70 or on an end piece pressing on it.

In this way a practically frictionless vertical movement of the work plate may be obtained which practically excludes and counteracts the tendency of the work plate to edge or to jam when moved from a single eccentrically located point.

The horizontal movement of the frame 21 may of course be obtained similarly by using a ball or roller race of the type described, but as there is no natural edging, the guiding on a limited number of wheels or rollers rotatably but fixedly mounted on the frame 21 is as a rule preferred.

As the work has to be carried out either in the dark room or under unfavorable light conditions an expeditious manipulation is very much dependent on the speed with which the reading of the scales 47, 48 takes place and according to the invention it is preferable therefore to use the scale shown in Figures 23 and 24 which is made up by means of a color or a similar scheme, so as to facilitate reading under difficult conditions.

As seen the part 80 of the scale provided with division marks and figures is surmounted by a color scheme scale 86 according to which each unit, which may be one of the usual inch units, or a metric unit or a typographical unit or the like is united with the point from which it is counted by a colored strip 81, 82, 83. The color of this strip is so selected that it will be easily traced and is identifiable without difficulty. Instead of a color a conspicuous design or pattern may be used. The operator can therefore at a glance, merely by observing the colored strip shift the work plate for the required number of units.

This scale may cooperate with an indicator or marker 84 which forms part of a smaller scale 85 on which a riding indicator or marker 85' may be shifted.

The color scheme is mainly used when the operator has to move the frame or work plate over distances representing a certain number of units which is a most frequent case. Assuming that the original is cut to a predetermined length and width which is the most typical and frequent case in order to align the images, shifting for a number of units representing the length or the width of the original is required. Each number is represented by a color. The operator while shifting the frame 21 horizontally or the work plate 30 vertically simply observes the color which belongs to this number of units, and shifts the moving member which, as a rule, carries the color strip until the end of the selected strip coincides with the marker. This under dark room condition is a marked improvement over a scale bearing numbers, which, as a rule, can only be read with extreme difficulty.

Where shifting has to take place over distances which do not represent a number of entire units but which include fractions of units, the second and shiftable indicator is used. This movable indicator 85 is first adjusted with respect to the fixed marker 84 to the length over which shifting should occur. Before shifting the operator noted the point above one of the markers, say the marker 85, which is comparatively easy with the assistance of the color scheme, and now shifts the frame or work plate until this point reaches the second marker. He will then be certain that the images are practically aligned.

In actual operation the operator fixes the original on the work plate 30 by suitable means, usually by means of a certain adhesive or glue, in general use for this purpose or by means of black or transparent adhesive strips or the like. The original when fixed on the work plate is indicated at A in Figures 25 to 28 which illustrate the method employed. He then adjusts his camera in such a way that the sensitized layer of the film or plate which is exposed will just be covered by the image of the work plate 30 or by that portion of the work plate which is used for the time being.

In Figure 25 it is assumed that the camera is so adjusted that point C coincides with the line running through the optical center of the camera. The original A, it is assumed, is fixed with its one end close to the vertical running through said optical center C and with its horizontal border at a distance $d$ from the horizontal line running through the optical center C.

The original is now either lighted or exposed for the required time, its image filling only a small strip of the film or plate. After exposure the knob 36 is turned so that the original occupies a position now at a distance $d'$ from the horizontal passing through the optical center C said distance $d'$ being equal or approximately equal to $d$ plus $w$, where $w$ is the width of the original A. Again an exposure is made and the knob 36 is turned until the distance $d'$ is now $d$ plus $2W$ and the operation is repeated as many times as necessary, or until the entire strip at the left of the vertical line through C has been covered. Then the knob 12 is turned to shift the frame to the right until the original A is now at the right of the vertical line through the center C as shown in Figure 27. Starting again with an exposure at the distance $d$ from the horizontal line, the work plate 30 is again lifted by turning knob 36 until the original is at a distance $d'$ equal to $d$ plus $w$, another exposure is made, the original is lifted until it occupies a position at a distance $d'$ equals $d$ plus $2w$ and the operation goes on in this way until the exposed surface is filled with the images of the original taken at different positions.

When a plate or film has thus been prepared it is developed and copied and furnishes immediately a large number of copies of the original taken at relatively high speed and without any waste of material if the apparatus has been properly handled.

It will be clear to the expert skilled in the art that the main point is to satisfy the basic conditions of the method as above explained and that changes and modifications of the apparatus used as long as those basic conditions are fulfilled are of minor importance and do not constitute a departure from the invention.

We claim:

An outfit for producing multiple photographic copies from an original by multiple exposure of a sensitized surface arranged in the focal plane of a stationary camera, comprising a movable holding plate for the original covering an area which is a multiple of the area covered by the original and which is completely covered by a non-actinic surface, said holding plate being adapted to fixedly hold and carry the original on the surface facing the camera, in a plane parallel to the focal plane at a distance at which the image of the original on the work plate covers merely a fraction of the sensitized layer in the camera, a frame holder, a frame slidably arranged therein, means for slidably holding the holding plate within said slidable frame for a longitudinal movement along said frame, the direction of movement of the frame within the frame holder being perpendicular to the direction of movement of the holding plate within the frame, means for moving said frame and for fixing it in a predetermined position within said frame holder, means for moving said holding plate within said frame and for fixing it in a predetermined position, a scale on said slidable frame, a fixed indicator marker cooperating with said scale, a further fixed scale associated with said fixed indicating marker, and a gliding marker on said last named scale, adapted to be adjusted on the latter to mark in advance the extent of the shifting movement.

JUSTUS S. STONER.
ALVIN H. LUITJENS.

REFERENCES CITED

The following references are of record in the file of this patent:

UNITED STATES PATENTS

| Number | Name | Date |
|---|---|---|
| 872,871 | Wayland | Dec. 3, 1907 |
| 1,226,838 | Wolber | May 22, 1917 |
| 1,258,636 | Newton | Mar. 5, 1918 |
| 1,393,793 | Kryzanowsky | Oct. 18, 1921 |
| 1,588,425 | John | June 15, 1926 |
| 1,729,176 | Misuraca | Sept. 24, 1929 |
| 1,861,515 | Williams | June 7, 1932 |
| 1,958,727 | Sullivan | May 15, 1934 |
| 2,168,503 | Williamson | Aug. 8, 1939 |
| 2,239,783 | Heitschmidt | Apr. 29, 1941 |
| 2,282,337 | Mies | May 12, 1942 |
| 2,348,457 | Drehs | May 9, 1944 |

FOREIGN PATENTS

| Number | Country | Date |
|---|---|---|
| 359,208 | France | Jan. 13, 1906 |
| 225,967 | Germany | Sept. 22, 1910 |
| 692,788 | France | Nov. 10, 1930 |
| 539,822 | Germany | Dec. 12, 1931 |